May 30, 1961 D. E. J. BUCKINGHAM 2,986,003
FUEL SUPPLY SYSTEMS FOR COMPOUND RAMJET-TURBOROCKET ENGINES
Filed April 3, 1958 3 Sheets-Sheet 1
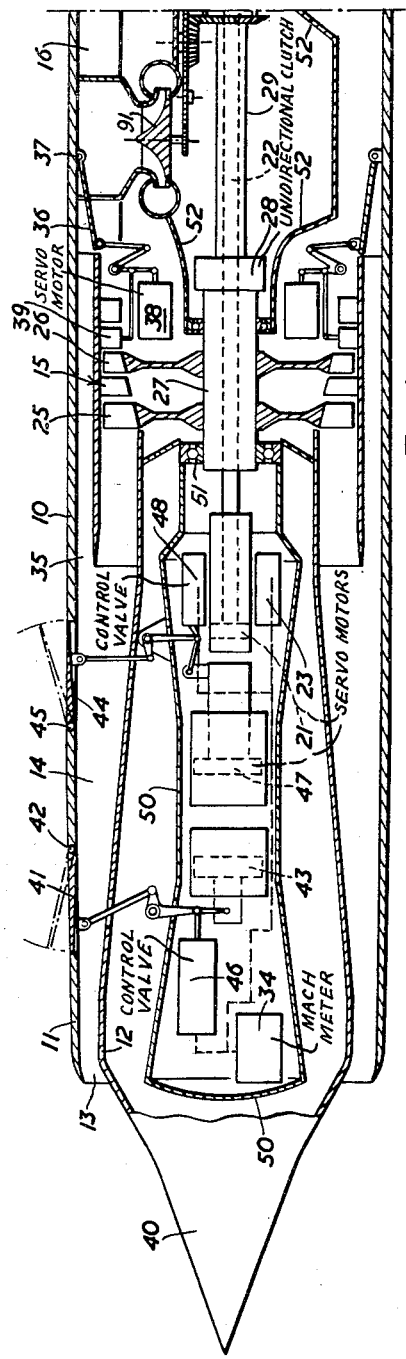
FIG. IA.
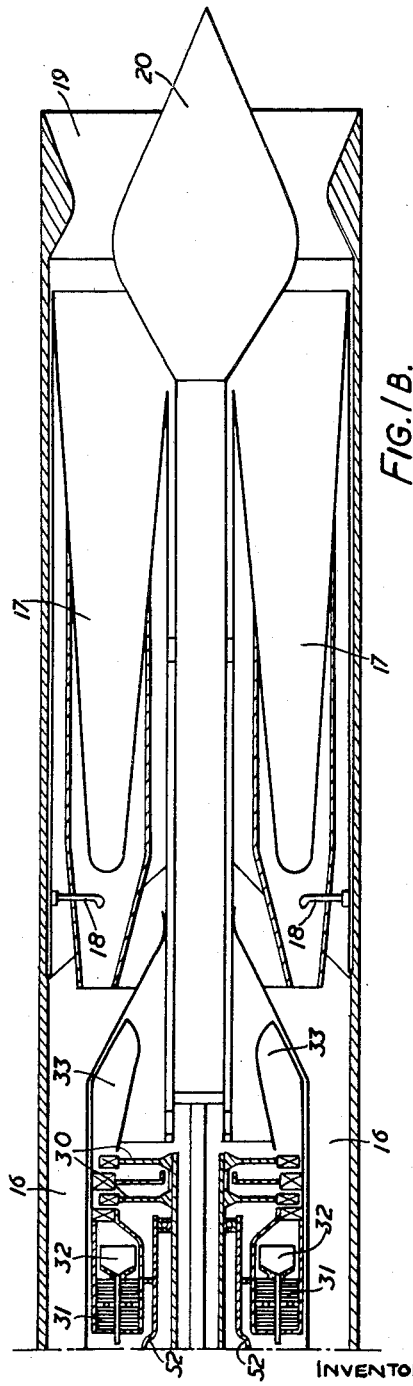
FIG. IB.
INVENTOR
D. E. J. BUCKINGHAM
BY
ATTORNEY

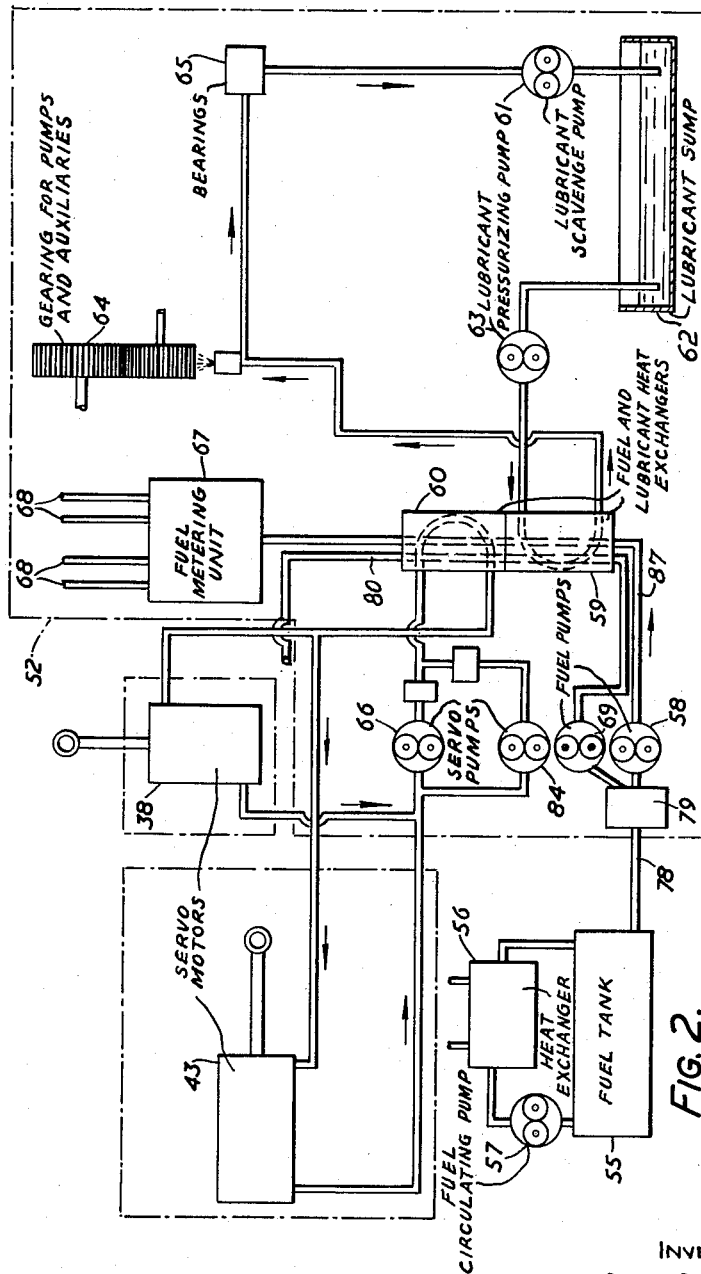

United States Patent Office 2,986,003
Patented May 30, 1961

2,986,003
FUEL SUPPLY SYSTEMS FOR COMPOUND RAMJET-TURBOROCKET ENGINES

David Edwin James Buckingham, London, England, assignor to D. Napier & Son Limited, London, England, a company of Great Britain Filed Apr. 3, 1958, Ser. No. 726,291

Claims priority, application Great Britain Apr. 4, 1957

2 Claims. (Cl. 60—35.6)

This invention relates to fuel supply systems for aircraft or missile engines comprising a compounded ramjet engine with a turborocket engine.

In such engines the ramjet section comprises a main ram air intake, a main combustion chamber, and an exhaust nozzle. The turborocket section comprises essentially a rocket type gas generator, a rocket turbine driven by these gases, and an exhaust duct, which may lead into the main combustion chamber. The rocket turbine is coupled to a compressor, arranged to deliver compressed air to the main combustion chamber, such that at relatively low speeds when the ram effect is insufficient to support combustion in the main combustion chamber, the ramjet section operates somewhat in the manner of a conventional gas turbine engine, though the turbine is driven by the rocket gases, and not by the products of combustion of the main combustion chamber. This manner of operation is referred to for convenience herein as the "rocketing regime." At higher speeds, when the ram effect is sufficient in itself to maintain combustion, the rocket section may be cut out of operation, and the engine will then function as a conventional ramjet engine, this condition being referred to for convenience as the "ramjet regime."

It will be appreciated that fuel must be supplied to the main combustion chamber during both the ramjet and rocketing regimes. On the other hand fuel need be supplied to the rocket gas generator only during the rocketing regime.

It is an object of the invention to provide a fuel system which will satisfactorily meet the requirements of such an engine, and will absorb the minimum power. According to the invention a fuel supply system for a compound ramjet-turborocket engine of the kind referred to, comprises a rocket fuel pump driven by the rocket turbine, and supplying fuel to the rocket gas generator, and a separate main fuel pump driven by an independent motor and supplying fuel to the main combustion chamber.

Thus it will be appreciated that the capacity of the main fuel pump need be sufficient only to meet the fuel requirements of the main combustion chamber, and power will be absorbed by the rocket fuel pump only when needed by the rocket section.

Preferably the independent motor driving the main fuel pump comprises an air turbine driven by compressed air within the ram air intake.

Moreover according to a preferred feature of the invention the two pumps are coupled to one another through transmission mechanism including a unidirectional clutch, arranged to permit power to be transferred from the turbine to the main fuel pump, but to permit the turbine and rocket fuel pump to remain inoperative when the main fuel pump is driven by the independent motor.

The auxiliary fluid pressure circuits, such as servo and lubrication circuits, can also conveniently be arranged so as to be driven when appropriate by the rocket turbine, or the independent motor.

The invention may be performed in various ways but one specific embodiment will now be described by way of example with reference to the accompanying drawings in which—

Figures 1A and 1B represent a combined sectional elevation of an engine,

Figure 2 is a diagrammatic illustration of the fuel, lubrication and hydraulic servo circuits.

Figure 3:
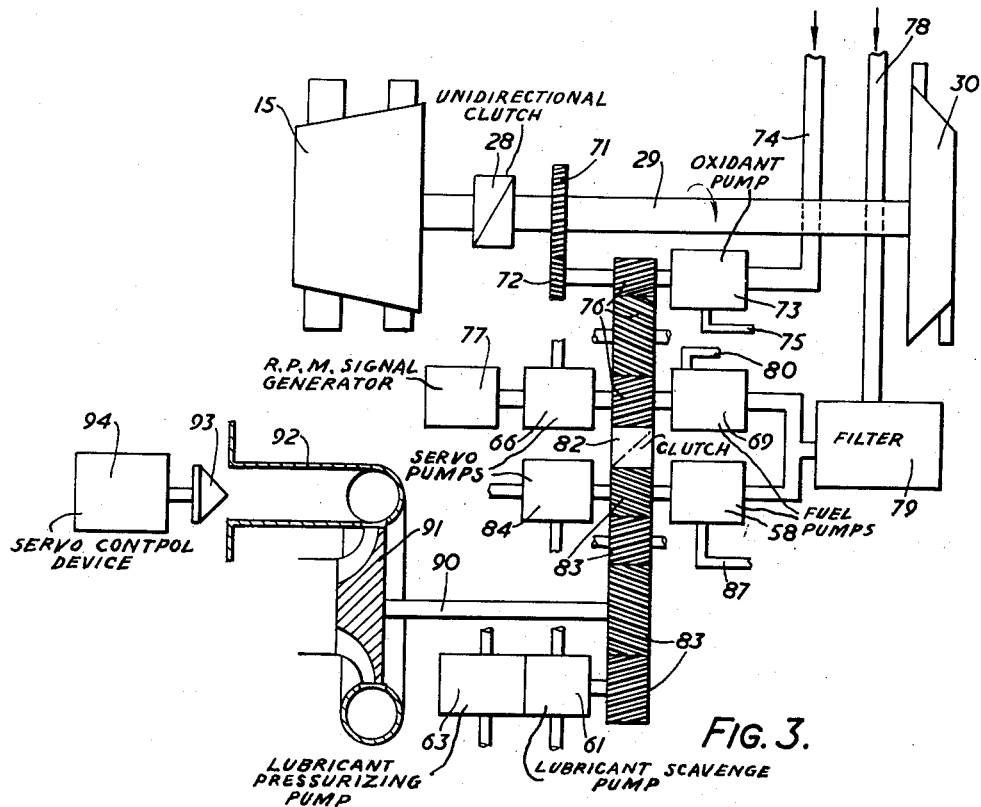
Figure 3 is a diagrammatic illustration of the driving mechanism for the pumps.

This engine is a compounded ramjet-turborocket engine. It includes an outer generally cylindrical casing 10, the front end 11 of which forms with a conical centre body 12 an annular air intake 13 leading to an axial diffuser passage 14 and then to an axial flow compressor 15 from which the air passes rearwardly through an annular air duct 16 into an annular combustion chamber 17 to which a hydrocarbon fuel such as paraffin is supplied through burners 18. The hot products of combustion issue through a nozzle 19 at the rear of the engine as a high speed propulsion jet. A bullet 20 is provided for adjusting the area of the nozzle, this bullet being axially movable by a hydraulic ram 21 disposed in the front part of the engine and connected to the bullet by a long shaft 22 extending rearwardly through the centre of the engine. The ram 21 is controlled by a follow-up servo valve 23.

The compressor comprises two rotor blade rings 25, 26 mounted on a hollow shaft 27 which is connected by a freewheel mechanism 28 to another hollow shaft 29 at the downstream end of which is mounted a two stage axial flow turbine 30. This turbine is driven by a rocket system including catalytic decomposition chambers 31 to which hydrogen peroxide is supplied and decomposed to form oxygen-rich steam, and rocket combustion chambers 32 into which some paraffin is then introduced for combustion with some of the oxygen. The combustion products, which are still rich in oxygen, are expanded in the turbine 30, and then pass through ducts 33 to enter the main combustion chamber 17 along with the air from the said annular duct 16, to contribute to the propulsive effect of the jet. Also, the residual oxygen content of the turbine effluent assists the main combustion process.

Provision is also made for the engine to operate as a pure ramjet when a sufficiently high speed has been reached. For this purpose an annular by-pass duct 35 is provided around the axial flow compressor 15, and the downstream end of this by-pass duct communicates through flap valves 36, pivoted at 37, with the said annular air duct 16 at the downstream end of the compressor. These flap valves 36 are actuated by hydraulic servo motors 38 which also actuate a ring of adjustable stator blades 39 for the last stage of the compressor to increase the flow through the compressor and losses therein during ramjet operation. At a predetermined Mach number, when the ram effect alone will provide sufficient compression of the air, and which is sensed by a Mach meter indicated generally at 34, the hydrogen peroxide and paraffin supply to the rocket system is automatically shut off, thus stopping the turbine 30 and removing the power supply for the axial flow compressor 15. At the same time the by-pass flap valves 36 are opened to allow air from the air intake 13 to pass through the annular by-pass duct 35 to the combustion chamber 17. The free wheel mechanism 28 between the turbine 30 and the axial flow compressor 15 permits the latter to "windmill" during ramjet operation.

The centre body 12 has a conical nose tip 40, and cooperates with the outer cowl 11 to provide shock compression during ramjet operation. Behind the lip of the cowl at the beginning of the diffuser section 14 there is an annular port providing communication between the outside of the engine and the diffuser section.

During ramjet operation this port is closed by a series of petal type flaps 41 pivotally attached to the outer shell of the engine at their rear ends 42. During turbo rocket operation these flaps are swung outwards as shown in chain lines by a hydraulic servo motor 43 controlled by a follow-up servo valve 46, so as to provide an additional annular air intake of larger diameter surrounding the main air intake 13.

Towards the rear end of the diffuser section 14 and upstream of the axial flow compressor 15 there is arranged another series of similar pivoted flaps 44 controlling another annular port in the outer shell 11 which constitutes a controllable spill port which is opened during ramjet operation to the extent required to maintain the desired shock pattern at the intake. These flaps 44 are pivotally connected to the shell at their upstream ends 45 and are opened outwards by a hydraulic servo motor 47 controlled by a follow-up servo valve 48.

Thermally insulated compartments are provided in the engine within the annular air duct through the engine. There is a front compartment 50 lying mainly within the diffuser section 14 and terminating adjacent the forward end of the compressor 15. This compartment houses the hydraulic servomotors 43, 47 which are connected through mechanical linkages with the said two series of flaps 41 and 44, and their control valves 46, 48. It also houses the Mach meter 34 and the shock sensing system, a forward bearing 51 for the axial flow compressor 15, and the hydraulic ram 21 for adjusting the position of the nozzle bullet 20.

A second insulated compartment 52 surrounds the shaft 29 connecting the turbine to the compressor and encloses the freewheel mechanism 28, pumps for lubricant, servomotor fluid, paraffin and hydrogen peroxide, gearing for driving these pumps and other auxiliaries. This compartment also contains a sump of lubricating oil, two heat exchangers through which paraffin fuel is pumped in succession as a coolant and a metering unit for the paraffin.

The fuel supply system and lubricating and hydraulic servo supply circuits are illustrated in Figure 2.

Paraffin is supplied from a tank 55 mounted outside the engine, for example in an aircraft or missile to which the engine is attached. The fuel in this tank is used as a coolant or heat sink for parts of the aircraft and a heat exchanger 56 and fuel circulating pump 57 are provided for the purpose. The fuel in the tank 55 may thus be at a relatively high temperature possibly close to the vaporization point. In order to permit the fuel to be further heated, and used as a coolant in the process, it is admitted to the engine through a pressurizing pump 58 which raises its pressure substantially. The fuel then passes in succession through two heat exchangers 59, 60.

In the first heat exchanger 59 the paraffin takes up heat from lubricating oil which is delivered by a pump 63 from a sump 62, through the heat exchanger, to the gearing for the pumps and auxiliaries indicated diagrammatically at 64 and to the turbine and compressor bearings indicated at 65 all these parts being within the said insulated compartments 52 and therefore receiving little heat. In the second heat exchanger 60 the paraffin takes up heat from the actuating fluid of the several hydraulic servomotors such as 43, 47, 21 and 38. The paraffin then passes to a metering unit 67 and on to the burners 18 via ducts 68. The paraffin for ramjet operation may be similarly used, being driven through the heat exchangers 59 and 60 to the pump 69.

The hydraulic servo circuit includes a pressurizing pump 66 which impels the servo fluid through the heat exchanger 60, and thence in parallel to the servo rams two of which are indicated diagrammatically at 38 and 43.

The gearing and drive for the hydrogen peroxide, paraffin fuel, lubricating oil, hydraulic servo and other pumps is illustrated diagrammatically in Figure 3. The shaft 29 on which is mounted the rocket turbine 30 is connected through gearing 71, 72 to drive a pump 73 which receives hydrogen peroxide from a main supply conduit 74 and delivers it under pressure to the catalytic decomposition chambers 31 via a conduit 75. The turbine shaft 29 is also arranged to drive through the gearing 71, 72 and further gearing 76, three units 77, 66 and 69. Unit 77 is a hydraulic r.p.m. signal generator which provides a fluid pressure proportional to the speed of rotation of the turbine, and is used for automatic control purposes. Servo pump 66 is arranged to provide servo fluid under pressure to operate the servos 43, 47, 38 etc. when the rocket turbine 30 is in operation. Pump 69 is arranged to receive paraffin fuel from the main aircraft fuel tank 55 through duct 78 via a filter 79 and to deliver the fuel under increased pressure to the rocket combustion chambers 32 via a conduit 80.

The gearing 76 is connected through a free wheel device 82 to another gear train indicated at 83, this gearing drives the second servo pump 84, as illustrated in Figure 2, and the ramjet paraffin pump 58, which delivers paraffin at high pressure through duct 87 to the heat exchangers 59, 60, and thence to the main burners 18. This gear train 83 also drives pumps 63, and 61, the pressure and scavenge pumps in the circuit illustrated in Figure 2.

The gearing 83 is also connected by a shaft 90 to a radial flow turbine 91 to which air is supplied under pressure from the annular air duct 16. The exhaust of this turbine is allowed to escape to a low pressure region such as atmosphere through a duct 92 in which is arranged an adjustable throttle valve 93 under the control of a servo control device 94.

Thus in operation when the engine is first started by an external booster pump or starter motor, the rocket turbine 30 will be driven by the rocket exhaust and this will drive both the main compressor 15 through the free wheel 28, and also all units driven by gearing 76, and in addition will drive through the free wheel 82 and gearing 83 all the units connected to this gearing 83. When the engine has achieved a forward flight speed sufficient for ramjet operation the rocket section will be shut down and the turbine 30 will stop. The main compressor 15 can then windmill overrunning the turbine shaft by means for the free wheel 28, but the gearing 76 will not be driven by the turbine and the units 73, 77, 66 and 69 will be out of operation. The air turbine 91 however will then be driven by the relatively high pressure in the annular air duct 15 and through the shaft 90 and gearing 83 all units associated therewith will be driven. In particular pump 58 supplying fuel to the main burners 18, servo pump 84 and lubrication pumps 61 and 63 will then continue to be driven by the air turbine.

What I claim as my invention and desire to secure by Letters Patent is:

1. A fuel supply system for a compound ramjet turborocket engine comprising a main combustion chamber, a turbine, a rocket gas generator, a rocket fuel pump driven by the turbine, and supplying fuel to the rocket gas generator, and a main fuel pump driven by an independent motor and supplying fuel to the main combustion chamber wherein said main fuel pump and said rocket fuel pumps are coupled through a unidirectional clutch connected to transfer power from the turbine to the main fuel pump, said clutch permitting the turbine and rocket fuel pump to remain inoperative when the main fuel pump is driven by the independent motor.

2. A fuel supply system according to claim 1 further including auxiliary fluid pressure circuits including fluid pressure pumps connected to be driven alternatively by either the rocket turbine or by the independent motor.

References Cited in the file of this patent

UNITED STATES PATENTS 2,814,928     Davies et al. _____ Dec. 3, 1957

FOREIGN PATENTS 749,009     Great Britain _____ May 16, 1956